US011868153B2

(12) United States Patent
Oh et al.

(10) Patent No.: US 11,868,153 B2
(45) Date of Patent: Jan. 9, 2024

(54) SEMICONDUCTOR INTEGRATED CIRCUIT DEVICE CAPABLE OF COMPENSATING FOR CURRENT LEAKAGE AND METHOD OF OPERATING THE SAME

(71) Applicant: SK hynix Inc., Icheon-si (KR)

(72) Inventors: Min Wook Oh, Icheon-si (KR); Chang Ki Baek, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 52 days.

(21) Appl. No.: 17/566,374

(22) Filed: Dec. 30, 2021

(65) Prior Publication Data

US 2023/0072253 A1 Mar. 9, 2023

(30) Foreign Application Priority Data

Sep. 7, 2021 (KR) ........................ 10-2021-0118894

(51) Int. Cl.
*G05F 3/26* (2006.01)

(52) U.S. Cl.
CPC .................................... *G05F 3/262* (2013.01)

(58) Field of Classification Search
None
See application file for complete search history.

(56) References Cited

U.S. PATENT DOCUMENTS 7,564,274 B2 * 7/2009 Hughes ................ H03K 17/165 327/108
7,911,263 B2 * 3/2011 Guo ................... H03K 17/0822 327/543
7,940,577 B2 * 5/2011 Shimogawa ............. G11C 5/14 365/189.11
8,004,351 B2 * 8/2011 Ikenaga ............. H03K 19/0016 327/544
8,008,967 B2 * 8/2011 Okano ....................... H03L 1/00 327/544
9,618,560 B2 * 4/2017 Zhao .................. G01R 31/2628
9,863,994 B2 * 1/2018 Cher ..................... G01R 19/165
9,940,992 B2 * 4/2018 Atallah ................. G11C 11/419
2021/0156746 A1 5/2021 Kim et al.
2023/0060971 A1 * 3/2023 You ...................... G11C 29/025

FOREIGN PATENT DOCUMENTS

KR 0172234 B1 3/1999
KR 1020080066249 A 7/2008
KR 1020180135662 A 12/2018

* cited by examiner

*Primary Examiner* — Thomas J. Hiltunen
(74) *Attorney, Agent, or Firm* — William Park & Associates Ltd.

(57) ABSTRACT

A semiconductor integrated circuit device includes a current leakage detector, a leakage compensation pulse generator, and a leakage compensation voltage generator. The current leakage detector is configured to compare an internal voltage signal with a plurality of reference voltage signals with different levels to generate a current leakage state signal. The leakage compensation pulse generator is configured to generate a bias level compensation signal based on the current leakage state signal and a temperature state signal. The leakage compensation voltage generator is configured to generate the internal voltage signal based on the bias level compensation signal.

20 Claims, 6 Drawing Sheets

SEMICONDUCTOR INTEGRATED CIRCUIT DEVICE CAPABLE OF COMPENSATING FOR CURRENT LEAKAGE AND METHOD OF OPERATING THE SAME

CROSS-REFERENCES TO RELATED APPLICATION

The present application claims priority under 35 U.S.C. § 119(a) to Korean application number 10-2021-0118894, filed on Sep. 7, 2021, in the Korean Intellectual Property Office, which is incorporated herein by reference in its entirety.

BACKGROUND

1. Technical Field

Various embodiments may generally relate to a semiconductor integrated circuit device, particularly, to a voltage generator, more particularly, a semiconductor device using the voltage generator.

2. Related Art

An electronic device may include a plurality of electronic components. A computer system may include a plurality of semiconductor devices. The semiconductor devices in the computer system may include constant current sources configured to receive various power voltages and to generate various currents from the power voltages.

The constant current sources may receive a bias voltage with a voltage level to generate a constant current. In order to generate the constant current, it may be required to maintain the voltage level of the bias voltage.

SUMMARY

In example embodiments of the present disclosure, a semiconductor integrated circuit device may include a current leakage detector, a leakage compensation pulse generator and a leakage compensation voltage generator. The current leakage detector may be configured to compare an internal voltage signal with a plurality of reference voltage signals with different levels to generate a current leakage state signal. The leakage compensation pulse generator may be configured to generate a bias level compensation signal based on the current leakage state signal and a temperature state signal. The leakage compensation voltage generator may be configured to generate the internal voltage signal based on the bias level compensation signal from the leakage compensation pulse generator.

In example embodiments of the present disclosure, a semiconductor integrated circuit device may include a leakage compensation voltage generator, a current leakage detector and a leakage compensation pulse generator. The leakage compensation voltage generator may be configured to generate an internal voltage signal in an active mode. The leakage compensation voltage generator may be configured to generate the internal voltage signal based on a clock pulse of a bias level compensation signal in a power-down (standby) mode. The current leakage detector may be configured to receive a reference voltage signal and the internal voltage signal. The current leakage detector may be configured to compare the internal voltage signal with the reference voltage signal to generate a current leakage state signal. The leakage compensation pulse generator may be configured to receive the current leakage state signal and a temperature state signal. The leakage compensation pulse generator may be configured to control a width and a period of the clock pulse of the bias level compensation signal.

In example embodiments of the present disclosure, according to a method of compensating a current leakage of a semiconductor integrated circuit device, an internal voltage signal and a reference voltage signal may be compared with each other to generate a current leakage state signal. A width and a period of a clock pulse of the bias level compensation signal may be controlled based on the current leakage state signal and a temperature state signal. An internal voltage may be generated based on the bias level compensation signal.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
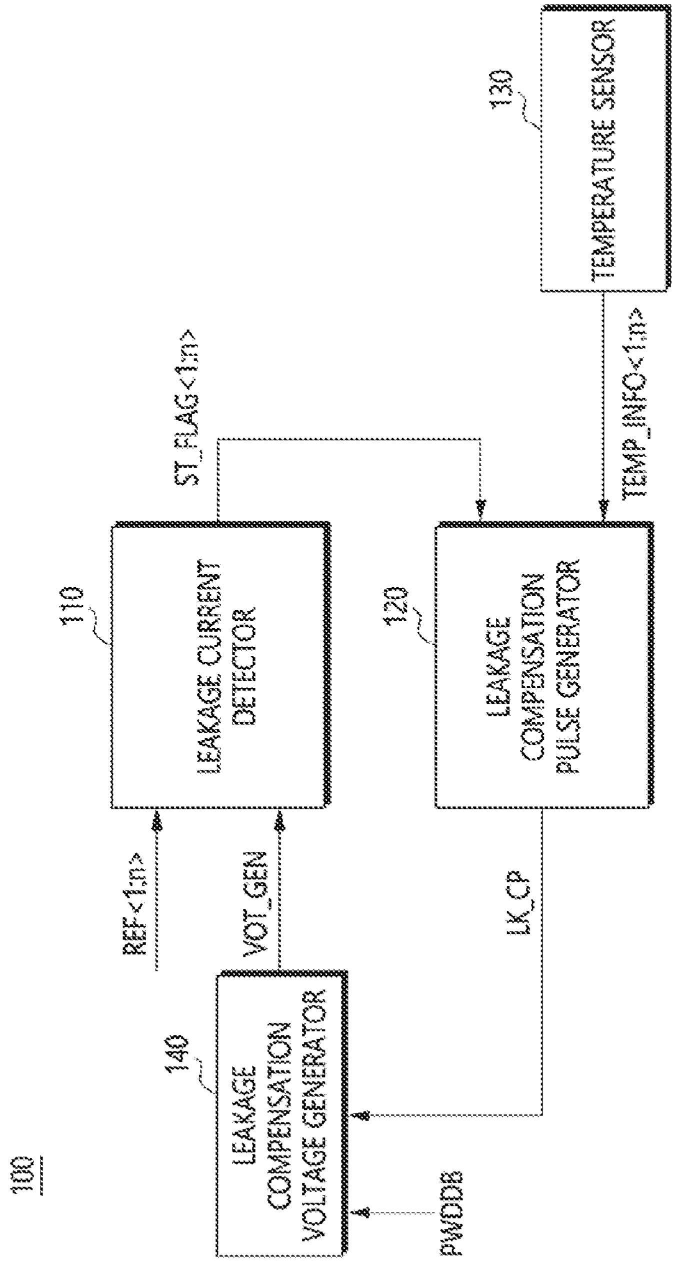
FIG. 1 is a view illustrating a semiconductor integrated circuit device in accordance with example embodiments.

FIG. 1 is a view illustrating a semiconductor integrated circuit device in accordance with example embodiments.

Referring to FIG. 1, a semiconductor integrated circuit device 100 of example embodiments may receive a reference voltage signal REF<1:n> and an internal voltage signal VOT_GEN. The semiconductor integrated circuit device 100 may compare the reference voltage signal REF<1:n> with the internal voltage signal VOT_GEN to generate a current leakage state signal ST_FLAG<1:n>.

In order to determine whether a received data signal is at a high logic level or a low logic level, it may be required to provide the reference voltage signal REF<1:n> with a reference voltage. The reference voltage may correspond to a middle value between a voltage that corresponds to a high logic level and a voltage that corresponds to a low logic level. The middle value may function as to an absolute voltage for determining whether the input signal is at a high logic level or a low logic level.

The internal voltage signal VOT_GEN may be generated from a leakage compensation voltage generator 140 according to the example embodiment. The leakage compensation voltage generator 140 may receive a power voltage and a ground voltage to generate the internal voltage signals VOT_GEN with various voltage levels. A configuration of the leakage compensation voltage generator 140 may be designed in accordance with a target voltage level. The leakage compensation voltage generator 140 may generate the internal voltage signals VOT_GEN through a pumping operation. The leakage compensation voltage generator 140 may include a pumping circuit (not shown) that is higher than the supply power voltage and lower than the ground power voltage.

When a semiconductor integrated circuit device 100 enters a power-down (standby) mode, the leakage compensation voltage generator 140 may output a current leakage. The current leakage may cause an abnormal operation of the integrated circuit device in an active mode after the power-down mode.

The current leakage state signal ST_FLAG<1:n> may be generated by detecting the current leakage that is generated in the power-down mode.

A current leakage detector 110 may compare the reference voltage signal REF<1:n> with the internal voltage signal VOT_GEN. When the reference voltage signal REF<1:n> is lower than the internal voltage signal VOT_GEN, the current leakage detector 110 may generate the current leakage state signal ST_FLAG<1:n> with a high logic level.

In contrast, when the reference voltage signal REF<1:n> is higher than the internal voltage signal VOT_GEN, the current leakage detector 110 may generate the current leakage state signal ST_FLAG<1:n> with a low logic level.

When the current leakage state signal ST_FLAG<1:n> is at a high logic level, a leakage compensation pulse generator 120 may control a width of a clock pulse.

A temperature state signal TEMP_INFO<1:n> may be periodically transmitted to a leakage compensation pulse generator 120 from a temperature sensor 130 in the semiconductor integrated circuit device through a refresh operation in the power-down mode to provide the leakage compensation pulse generator 120 with temperature information. The leakage compensation pulse generator 120 may generate a bias level compensation signal LK_CP based on the temperature state signal TEMP_INFO<1:n> to control a period of the clock pulse.

The semiconductor integrated circuit device 100 may include the current leakage detector 110, the leakage compensation pulse generator 120, the temperature sensor 130, and the leakage compensation voltage generator 140.

The current leakage detector 110 may receive the reference voltage signal REF<1:n> and the internal voltage signal VOT_GEN. The current leakage detector 110 may compare the reference voltage signal REF<1:n> with the internal voltage signal VOT_GEN to generate the current leakage state signal ST_FLAG<1:n>. When the level of the internal voltage signal VOT_GEN is lower than the reference voltage signal REF<1:n>, the current leakage detector 110 may output the current leakage state signal ST_FLAG<1:n> with a high logic level. In contrast, when the level of the internal voltage signal VOT_GEN is higher than the reference voltage signal REF<1:n>, the current leakage detector 110 may output the current leakage state signal ST_FLAG<1:n> with a low logic level.

The leakage compensation pulse generator 120 may receive the current leakage state signal ST_FLAG<1:n> and the temperature state signal TEMP_INFOR<1:n> to output the bias level compensation signal LK_CP.

The leakage compensation pulse generator 120 may receive the current leakage state signal ST_FLAG<1:n>. The leakage compensation pulse generator 120 may control the width of the clock pulse of the bias level compensation signal LK_CP based on the current leakage state signal ST_FLAG<1:n>.

The leakage compensation pulse generator 120 may receive the temperature state signal TEMP_INFO<1:n>. The leakage compensation pulse generator 120 may control the period of the clock pulse of the bias level compensation signal LK_CP based on the temperature state signal TEMP_INFO<1:n>.

The temperature state signal TEMP_INFO<1:n> of the temperature sensor 130 may correspond to the temperature of the semiconductor integrated circuit device 100. For example, the temperature state signal TEMP_INFO<1:n> may include any one of a first temperature, a second temperature, and a third temperature of the semiconductor integrated circuit device 100. The first temperature may be lower than the second temperature. The third temperature may be higher than the second temperature. The first temperature may be a cold temperature. The second temperature may be a room temperature. The third temperature may be a hot temperature. When the semiconductor integrated circuit device 100 has the first temperature, a minimum amount of current leakage may be generated. In contrast, when the semiconductor integrated circuit device 100 has the third temperature, a maximum amount of current leakage may be generated.

The temperature sensor 130 may periodically transmit the temperature state signal TEMP_INFO<1:n> to the leakage compensation pulse generator 120 through a refresh operation in the power-down mode. The temperature sensor 130 may include a general temperature sensor configured to output a temperature selection signal with a high logic level that corresponds to the detected temperature level.

The temperature sensor 130 may include an on die thermal sensor (ODTS) that is used in a DDR3 that is regulated by JEDEC. An example of the temperature sensor 130 may be disclosed in U.S. Patent Publication No. 2021/0156746. The U.S. Patent Publication No. 2021/0156746 may be incorporated herein by reference in its entirety.

The leakage compensation voltage generator 140 may periodically generate the internal voltage at a constant level in the active mode. In example embodiments, the leakage compensation voltage generator 140, in the power-down mode, may be maintained in a floating state in which no power may be applied to the leakage compensation voltage generator 140. For example, when the internal voltage signal VOT_GEN is generated in the power-down mode, a current leakage source that exists in the leakage compensation voltage generator 140 may be determined. The leakage compensation voltage generator 140 may receive the bias level compensation signal LK_CP. The leakage compensation voltage generator 140 may then generate the compensated internal voltage signal VOT_GEN based on the bias level compensation signal LK_CP.

Figure 2:
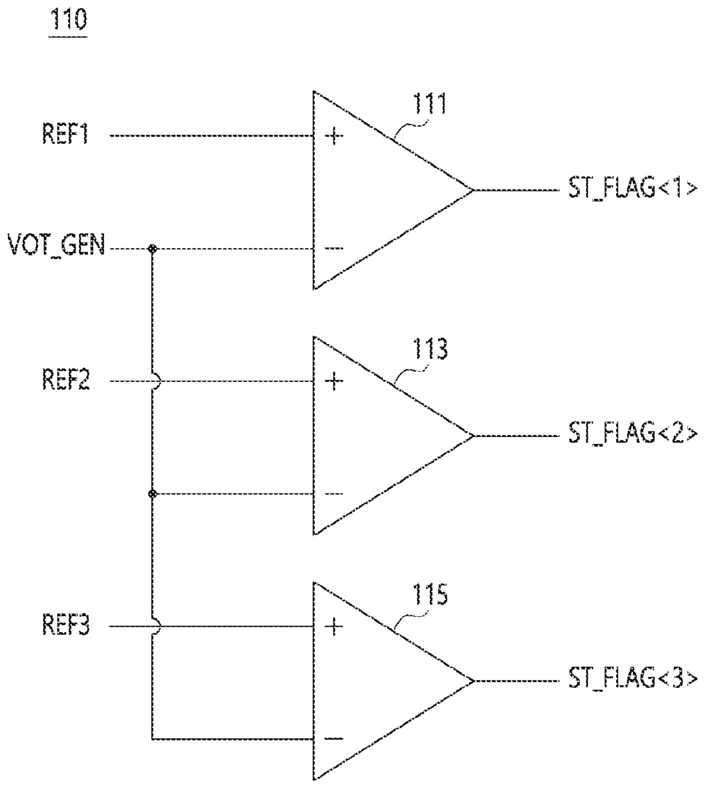
FIG. 2 is a view illustrating a current leakage detector in accordance with example embodiments.

FIG. 2 is a view illustrating a current leakage detector in accordance with example embodiments.

Referring to FIG. 2, the current leakage detector 110 may include a plurality of comparators configured to compare the reference voltage signal REF<1:n> with the internal voltage signal VOT_GEN.

FIG. 2 may depict the three reference voltage signal REF1~REF3, not limited thereto. For example, when the internal voltage signal VOT_GEN is lower than the reference voltage signal REF<1:n>, the current leakage detector 110 may output a current leakage state signal ST_FLAG<1:3> with a high logic level. In contrast, when the internal voltage signal VOT_GEN is higher than the reference voltage signal REF<1:n>, the current leakage detector 110 may output a current leakage state signal ST_FLAG<1:3> with a low logic level.

The current leakage detector 110 may include first to third comparators 111, 113, and 115.

The first comparator 111 may receive a first reference voltage signal REF1 and the internal voltage signal VOT_GEN.

The second comparator 113 may receive a second reference voltage signal REF2 and the internal voltage signal VOT_GEN.

The third comparator 115 may receive a third reference voltage signal REF3 and the internal voltage signal VOT_GEN.

The first to third reference voltage signals REF1, REF2, and REF3 may have different voltage levels. For example, the voltage level of the first reference voltage signal REF1 may be higher than the voltage level of the second reference voltage signal REF2. The voltage level of the second reference voltage signal REF2 may be higher than the voltage level of the third reference voltage signal REF3.

The internal voltage signal VOT_GEN may be generated in the leakage compensation voltage generator 140. For example, the internal voltage signal VOT_GEN may be generated in an analog signal form. The internal voltage signal VOT_GEN may be simultaneously input into the first to third comparators 111, 113 and 115. In example embodiments, the first to third comparators 111, 113 and 115 may have substantially the same configuration. Thus, only the first comparator 111 may be illustrated in detail with reference to FIG. 3 herein.

The first comparator 111 may include a first P channel MOS transistor P1, a second P channel MOS transistor P2, a first N channel MOS transistor N1, and a second N channel MOS transistor N2.

A source of the first P channel MOS transistor P1 may be connected to a power voltage VDD. The gate of the first P channel MOS transistor P1 may be connected to a gate of the second P channel MOS transistor P2. The drain of the first P channel MOS transistor P1 may be connected to a drain of the first N channel MOS transistor N1.

The source of the second P channel MOS transistor P2 may be connected to the power voltage VDD. The gate of the second P channel MOS transistor P2 may be connected to the gate of the first P channel MOS transistor P1. The drain of the second P channel MOS transistor P2 may be connected to a drain of the second N channel MOS transistor N2.

The gate of the first N channel MOS transistor N1 may receive the reference voltage REF1. The source of the first N channel MOS transistor N1 may be connected to the drain of the first P channel MOS transistor P1. The drain of the first N channel MOS transistor N1 may be connected to a ground voltage.

The gate of the second N channel MOS transistor N2 may receive the internal voltage VOT_GEN. The source of the second N channel MOS transistor N2 may be connected to the drain of the second P channel MOS transistor P2. The drain of the second N channel MOS transistor N2 may be connected to the ground voltage.

The first comparator 111 may compare the reference signal REF1 that is input into the first N channel MOS transistor N1 with the internal voltage signal VOT_GEN that is input into the second N channel MOS transistor N2.

When the voltage level of the internal voltage signal VOT_GEN is higher than the voltage level of the reference voltage signal REF1, the drain voltage of the first P channel MOS transistor P1 may be lower than the drain voltage of the second P channel MOS transistor P2 to output the first leakage current state signal ST_FLAG<1> with a high logic level. In contrast, when the voltage level of the internal voltage signal VOT_GEN is lower than the voltage level of the reference voltage signal REF1, the drain voltage of the first P channel MOS transistor P1 may be higher than the drain voltage of the second P channel MOS transistor P2 to output the first leakage current state signal ST_FLAG<1> with a low logic level.

The comparators 111, 113, and 115 of example embodiments may use a current mirror type comparison circuit configured to detect a change of the internal voltage signal VOT_GEN representing a current leakage value, not limited thereto.

Figure 4:
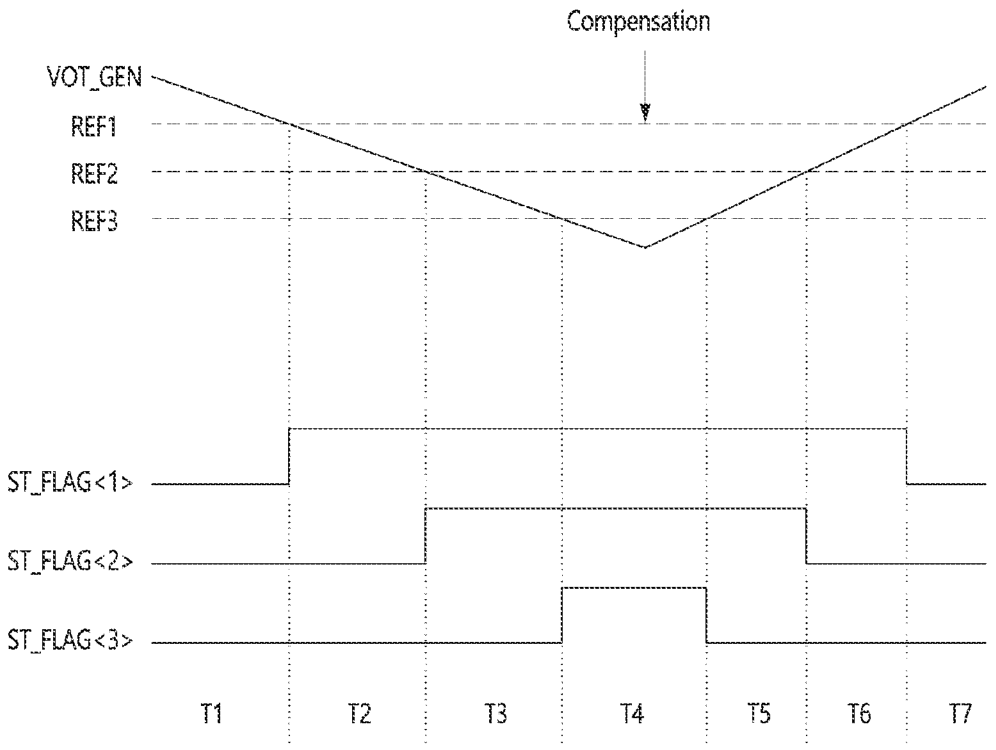
FIG. 4 is a view illustrating a distribution of an internal voltage and reference voltages and a timing of a current leakage state signal in accordance with a reference voltage level.

FIG. 4 is a view illustrating a distribution of an internal voltage and reference voltages and a timing of a current leakage state signal in accordance with a reference voltage level.

Referring to FIG. 4, when the voltage level of the internal voltage signal VOT_GEN is higher than the voltage levels of the first to third reference voltage signals REF1, REF2, and REF3 in T1, the first to third comparators 111, 113, and 115 may output a current leakage state signal ST_FLAG<1:3> with a low logic level.

When the voltage level of the internal voltage signal VOT_GEN is lower than the voltage level of the first reference voltage signal REF1 and higher than the voltage levels of the second and third reference voltage signals REF2 and REF3 in T2, the first comparator 111 may output a first leakage current state signal ST_FLAG<1> with a high logic level and the second and third comparators 113 and 115 may output second and third leakage current state signals ST_FLAG<2:3> with a low logic level.

When the voltage level of the internal voltage signal VOT_GEN is lower than the voltage levels of the first and second reference voltage signals REF1 and REF2 and higher than the voltage levels of the third reference voltage signal REF3 in T3, the first and second comparators 111 and 113 may output the first and second leakage current state signals ST_FLAG<1:2> with a high logic level and the third comparator 115 may output the third leakage current state signal ST_FLAG<3> with a low logic level.

When the voltage level of the internal voltage signal VOT_GEN is lower than the voltage levels of the first to third reference voltage signals REF1, REF2, and REF3 in T4, the first to third comparators 111, 113, and 115 may output a current leakage state signal ST_FLAG<1:3> with a high logic level.

When the voltage level of the internal voltage signal VOT_GEN is lower than the voltage levels of the first and second reference voltage signals REF1 and REF2 and higher than the voltage levels of the third reference voltage signal REF3 in T5, the first and second comparators 111 and 113 may output the first and second leakage current state signals ST_FLAG<1:2> with a high logic level and the third comparator 115 may output the third leakage current state signal ST_FLAG<3> with a low logic level.

When the voltage level of the internal voltage signal VOT_GEN is lower than the voltage level of the first reference voltage signal REF1 and higher than the voltage levels of the second and third reference voltage signals REF2 and REF3 in T6, the first comparator 111 may output a first leakage current state signal ST_FLAG<1> with a high logic level and the second and third comparators 113 and 115 may output second and third leakage current state signals ST_FLAG<2:3> with a low logic level.

When the voltage level of the internal voltage signal VOT_GEN is higher than the voltage levels of the first to third reference voltage signals REF1, REF2, and REF3 in T7, the first to third comparators 111, 113, and 115 may output a current leakage state signal ST_FLAG<1:3> with a low logic level.

Figure 5:
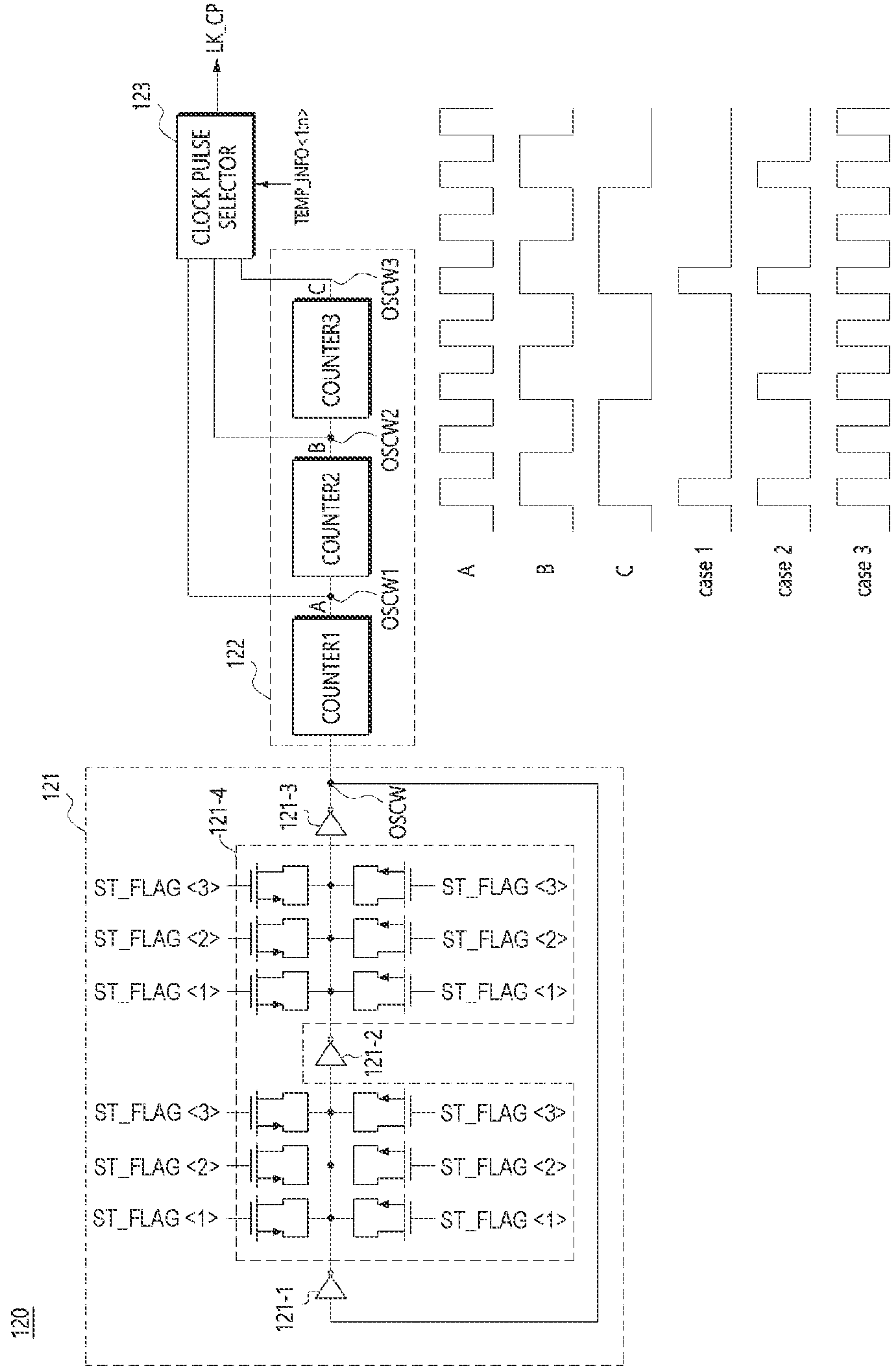
FIG. 5 is a view illustrating a leakage compensation pulse generator in accordance with example embodiments.

FIG. 5 is a view illustrating a leakage compensation pulse generator in accordance with example embodiments. FIG. 5 may depict the three reference voltage signals REF1~REF3, not limited thereto.

Referring to FIG. 5, the leakage compensation pulse generator 120 may receive the current leakage state signal ST_FLAG<1:3> and the temperature state signal TEMP_INFO<1:n> to output the bias level compensation signal LK_CP.

The leakage compensation pulse generator 120 may include a clock pulse generator 121, a counter 122, and a clock pulse selector 123.

The clock pulse generator 121 may be configured to generate the clock pulse. The clock that is generated from the clock pulse generator 121 may be used as a synchronizing signal for controlling operations of other semiconductor integrated circuits, such as an input signal of a voltage pumping circuit for increasing a voltage to a target voltage, etc.

The clock pulse generator 121 may receive the current leakage state signal ST_FLAG<1:3> to change the width of the clock pulse and to output a clock pulse signal OSCW.

In example embodiments, the clock pulse generator 121 may include a ring oscillator.

The ring oscillator may include a plurality of inverters 121-1~121-3 and a plurality of capacitor arrays 121-4 that are serially connected with each other. The ring oscillator may control the width of the clock pulse in accordance with a charged amount of the capacitor arrays 121-4.

The clock pulse generator 121 may increase the width of the clock pulse in proportion to the increasing number of enabled capacitor arrays 121-4 in accordance with the current leakage state signal ST_FLAG<1:3>. For example, when the first to third leakage current state signals ST_FLAG<1:3> is disabled to a low logic level, the pulse width of the pulse signal OSCW may be 1. When the first leakage current state signal ST_FLAG<1> is enabled to a high logic level, the pulse width of the pulse signal OSCW may become twice as wide (2×). When the second leakage current state signal ST_FLAG<2> is enabled to a high logic level, the pulse width of the pulse signal OSCW may become four times as wide (4×). When the third leakage current state signal ST_FLAG<3> is enabled to a high logic level, the pulse width of the pulse signal OSCW may become eight times as wide (8×).

The counter 122 may include a frequency divider. FIG. 5 may depict the three counters. However, the invention is not limited thereto, and additional counters may be incorporated.

The counter 122 may receive the clock pulse signal OSCW of the clock pulse generator 121. The counter 122 may then divide the clock pulse signal OSCW to output first to third clock pulse signals OSCW1, OSCW2 and OSCW3. The clock pulse signals OSCW1, OSCW2 and OSCW3 that are output from the counters may be input into the clock pulse selector 123.

Timing charts A, B, and C may show periods of the dock pulse signals OSCW that are output from the counters.

The timing chart A may show the 2× increased pulse period of the dock pulse signal OSCW. The timing chart B may show the 4× increased pulse period of the clock pulse signal OSCW. The timing chart C may show the 8× increased pulse period of the clock pulse signal OSCW.

The clock pulse selector 123 may receive the clock pulse signals OSCW1, OSCW2, and OSCW3. The clock pulse selector 123 may perform an AND operation on the clock pulse signals OSCW1, OSCW2, and OSCW3. The clock pulse selector 123 may select a clock pulse signal in accordance with the temperature state signal TEMP_INFO<1:n> to output the bias level compensation signal LK_CP Case 1 to 3 in timing chart may show periods of clock pulses that are controlled by the AND operation on the clock pulse signals OSCW1, OSCW2, and OSCW3.

The case 1 may show a period of a clock pulse when the AND operation is performed on the first to third clock pulse signals OSCW1, OSCW2, and OSCW3.

The case 2 may show a period of a clock pulse when the AND operation is performed on the first and second clock pulse signals OSCW1 and OSCW2.

The case 3 may show a period of a clock pulse that is synchronized with the first clock pulse signal OSCW1.

The clock pulse selector 123 may perform the AND operation on the clock pulse signals OSCW1, OSCW2, and OSCW3 with the controlled clock periods. The clock pulse selector 123 may output any one of the clock pulse signals OSCW1, OSCW2 and OSCW3 based on the temperature state signal TEMP_INFO as the bias level compensation signal LK_CP.

When the temperature of the semiconductor integrated circuit device 100 is increased, the clock pulse selector 123 may select the clock signals of case 1~case 3. For example, the temperature state signal TEMP_INFO<1:n> may include first to third temperature state signals TEMP_INFO<1>, TEMP_INFO<2>, and TEMP_INFO<3>. The first temperature state signal TEMP_INFO<1> may indicate the lowest temperature. The third temperature state signal TEMP_INFO<3> may indicate the highest temperature.

The clock pulse selector 123 may select only one of the cases 1 to 3 based on the temperature state signal TEMP_INFO<1:3>. When the clock pulse selector 123 receives the first temperature state signal TEMP_INFO<1>, the clock pulse selector 123 may only select the clock signal in case 1. When the clock pulse selector 123 receives the second temperature state signal TEMP_INFO<2>, the clock pulse selector 123 may only select the clock signal in case 2. When the clock pulse selector 123 receives the third temperature state signal TEMP_INFO<3>, the clock pulse selector 123 may only select the clock signal in case 3. Thus, although the clock signals in case 1 to 3 may be applied to a multiplexer 123-3, only one of the clock signals, as the bias level compensation signal LK_CP, may be output in response to the temperature state signal TEMP_INFO<1:3>. Therefore, the leakage compensation voltage generator 140 may stably generate the internal voltage of the semiconductor integrated circuit device 100 based on the bias level compensation signal LK_CP.

Figure 6:
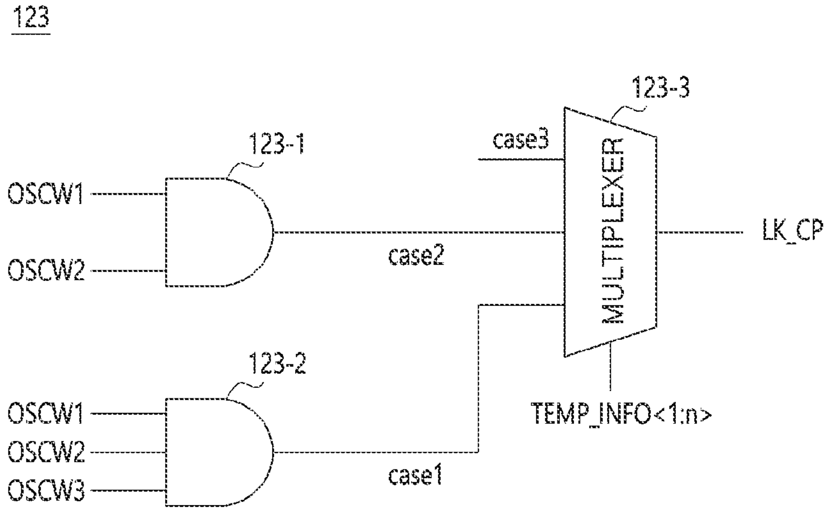
FIG. 6 is a view illustrating a clock pulse selector in accordance with example embodiments.

FIG. 6 is a view illustrating a clock pulse selector in accordance with example embodiments.

Referring to FIG. 6, the clock pulse selector 123 may receive the clock pulse signals OSCW1, OSCW2, and OSCW3 of the counter 122 and the temperature state signal TEMP_INFO<1:3>, The clock pulse selector 123 may perform the AND operation on the clock pulse signals OSCW1, OSCW2, and OSCW3. The clock pulse selector 123 may output any one of the clock pulse signals OSCW1, OSCW2, and OSCW3 as the bias level compensation signal LK_CP based on the temperature state signal TEMP_INFO<1:3>.

The clock pulse selector 123 may include first and second AND gates 123-1 and 123-2 and a multiplexer 123-3. The first and second AND gates 123-1 and 123-2 may be configured to control the period of the clock pulse. The multiplexer 123-3 may be configured to select any one of the clock signals based on the temperature state signal TEMP_INFO<1:3>.

The first AND gate 123-1 may perform the AND operation on the first clock pulse signal OSCW1 and the second clock pulse signal OSCW2 to generate the clock signal case 2.

The second AND gate 123-2 may perform the AND operation on the first to third clock pulse signals OSCW1, OSCW2, and OSCW3 to generate the clock signal case 1.

When the temperature state signal TEMP_INFO<1:3> is based on the cold temperature, for example, the temperature state signal TEMP_INFO<1> being at a high logic level, the multiplexer 123-3 may output the dock signal case 1 as the bias level compensation signal LK_CP. When the temperature state signal TEMP_INFO<1:3> is based on the room temperature, for example, the temperature state signal TEMP_INFO<2> being at a high logic level, the multiplexer 123-3 may output the clock signal case 2 as the bias level compensation signal LK_CP. When the temperature state signal TEMP_INFO<1:3> is based on the hot temperature, for example, the temperature state signal TEMP_INFO<3> being at a high logic level, the multiplexer 123-3 may output the clock signal case 3 as the bias level compensation signal LK_CP.

Figure 7:
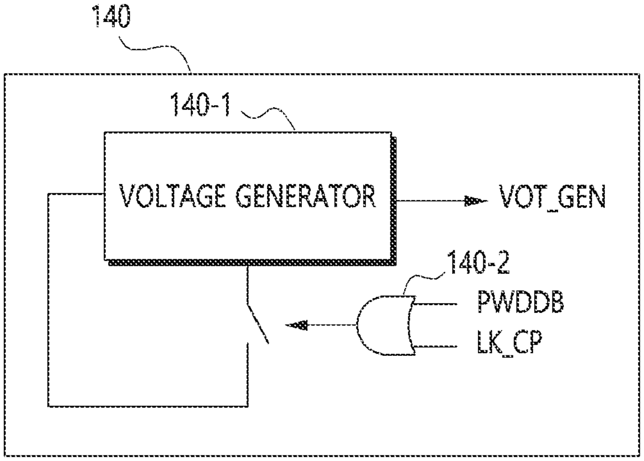
FIG. 7 is a view illustrating a leakage compensation voltage generator in accordance with example embodiments.

FIG. 7 is a view illustrating a leakage compensation voltage generator in accordance with example embodiments.

Referring to FIG. 7, the leakage compensation voltage generator 140 may periodically generate the internal voltage signal VOT_GEN at a constant level in the active mode. In contrast, the leakage compensation voltage generator 140 may be maintained in the floating (standby) state in the power-down mode.

The leakage compensation voltage generator 140 may include a voltage generator 140-1 and an OR gate 140-2.

The voltage generator 140-1 may include a general voltage generator. The voltage generator 140-1 may periodically generate the internal voltage signal VOT_GEN at a constant level in the active mode. The voltage generator 140-1 may generate the internal voltage signal VOT_GEN in the power-down mode in which current leakage may be compensated for.

The OR gate 140-2 may perform an OR operation on a complementary signal PWDDB of a power-down signal as a first input and the bias level compensation signal LK_CP as a second input. When the complementary signal of the power-down signal or the bias level compensation signal LK_CP is at a high logic level, the leakage compensation voltage generator 140 may be enabled to generate the internal voltage signal VOT_GEN with the compensated leakage current in the power-down mode of the voltage generator 140-1.

Hereinafter, operations of the semiconductor integrated circuit device 100 may be illustrated in detail with reference to FIGS. 2 to 7.

The leakage compensation voltage generator 140 may periodically generate the internal voltage signal VOT_GEN at a constant level in the active mode. The leakage compensation voltage generator 140 may be maintained in the floating state in the power-down mode. When the bias level compensation signal LK_CP is input, the leakage compensation voltage generator 140 may generate the internal voltage signal VOT_GEN based on the bias level compensation signal LK_CP.

Figure 3:
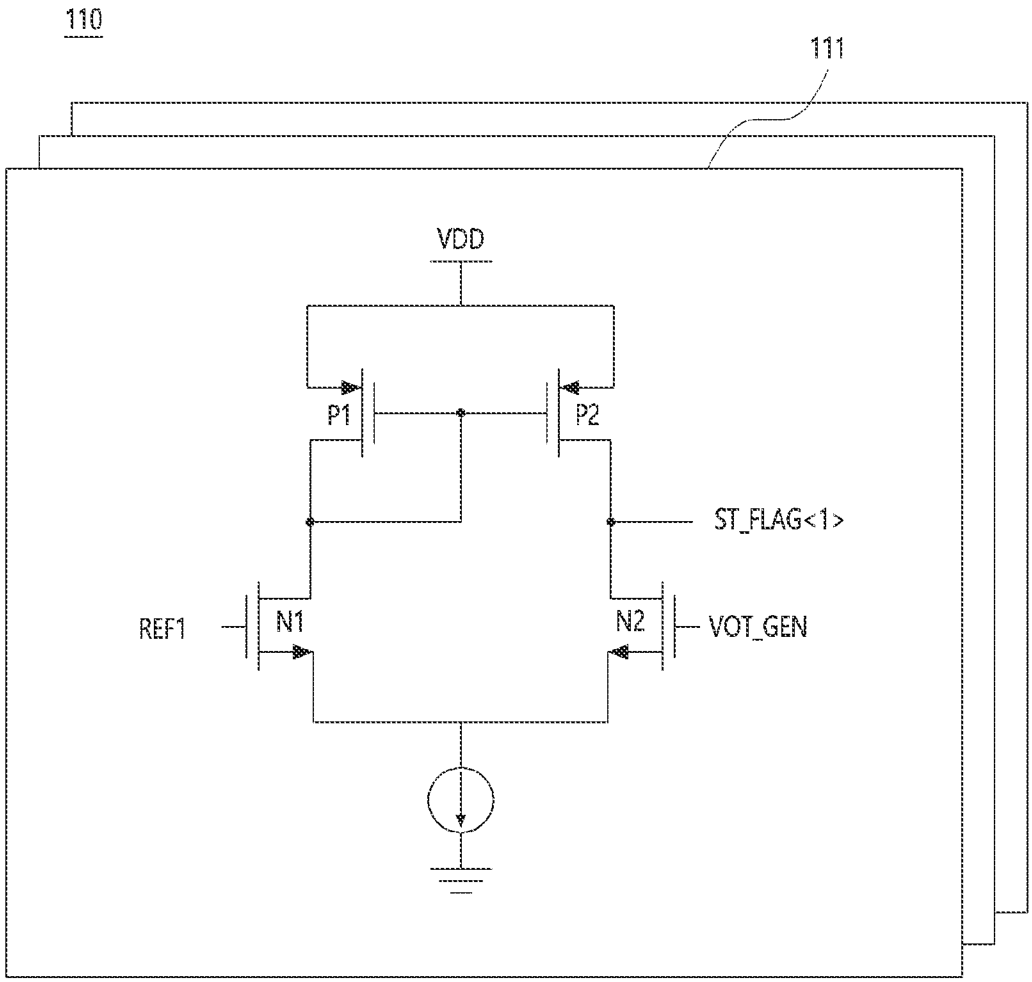
FIG. 3 is a circuit diagram illustrating a comparator in FIG. 2.

The current leakage detector 110 in FIGS. 2 and 3 may receive the reference voltage signal REF<1:3> and the internal voltage signal VOT_GEN. The current leakage detector 110 may then compare the reference voltage signal REF<1:3> with the internal voltage signal VOT_GEN to generate the current leakage state signal ST_FLAG<1:3>.

When the voltage level of the reference voltage signal REF<1:3> is higher than the voltage level of the internal voltage signal VOT_GEN, the current leakage state signal ST_FLAG<1:3> in FIG. 4 with a high logic level may be output. When the voltage level of the reference voltage signal REF<1:3> is lower than the voltage level of the internal voltage signal VOT_GEN, the current leakage state signal ST_FLAG 1:3> with a low logic level may be output.

As shown in FIG. 5, the leakage compensation pulse generator 120 may control the width of the clock pulse of the bias level compensation signal LK_CP based on the current leakage state signal ST_FLAG<1:3>. The leakage compensation pulse generator 120 may control the period of the dock pulse of the bias level compensation signal LK_CP based on the temperature state sign& EMP_INFO<1:3>.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A semiconductor integrated circuit device comprising:

a current leakage detector configured to compare an internal voltage signal with a plurality of reference voltage signals with different levels to generate a plurality of leakage current state signals;

a leakage compensation pulse generator configured to generate a bias level compensation signal and to control a width and a period of clock pulse of the bias level compensation signal, based on the plurality of leakage current state signals and a temperature state signal; and a leakage compensation voltage generator configured to generate the internal voltage signal based on the bias level compensation signal.

2. The semiconductor integrated circuit device of claim 1, wherein the current leakage detector comprises at least one comparator configured to compare the internal voltage signal with the reference voltage signals to generate the plurality of leakage current state signals.

3. The semiconductor integrated circuit device of claim 1, wherein the leakage compensation pulse generator comprises:

a clock pulse generator configured to receive the plurality of leakage current state signals and control a width of a clock pulse signal to output the clock pulse signal;

a counter receiving the clock pulse signal and dividing the clock pulse signal to generate clock pulse signals with different periods; and a clock pulse selector configured to receive the clock pulse signals, generate a plurality of clock signals based on the temperature state signal and the clock pulse signals, and output any one of the clock signals as the bias level compensation signal.

4. The semiconductor integrated circuit device of claim 3, wherein the clock pulse generator comprises a ring oscillator that receives the plurality of leakage current state signals and controls the width of the clock pulse signal through an oscillating operation to output the clock pulse signal.

5. The semiconductor integrated circuit device of claim 3, wherein the counter comprises a plurality of counters that receive and divide the clock pulse signals to generate the clock pulse signals with the different periods.

6. The semiconductor integrated circuit device of claim 3, wherein the clock pulse selector comprises:

a plurality of logic gates configured to receive the clock pulse signals with the different periods to generate the clock signals with different periods; and a multiplexer configured to select any one of the clock signals based on the temperature state signal and output the selected clock signal as the bias level compensation signal.

7. The semiconductor integrated circuit device of claim 1, wherein the leakage compensation voltage generator is configured to periodically generate the internal voltage signal at a constant level in an active mode and configured to periodically generate the internal voltage signal in a power-down (standby) mode based on the bias level compensation signal.

8. A semiconductor integrated circuit device comprising:

a leakage compensation voltage generator configured to periodically generate an internal voltage signal in an active mode and periodically generate the internal voltage signal in a power-down (standby) mode based on a clock pulse of a bias level compensation signal;

a current leakage detector configured to receive the internal voltage signal and a plurality of reference voltage signals and configured to compare the internal voltage signal with the reference voltage signals to generate a plurality of leakage current state signals; and a leakage compensation pulse generator configured to receive the plurality of leakage current state signals and a temperature state signal and configured to control a width and a period of the clock pulse of the bias level compensation signal.

9. The semiconductor integrated circuit device of claim 8, wherein the leakage compensation voltage generator is configured to periodically generate the internal voltage signal at a constant level in an active mode and configured to periodically generate the internal voltage signal in a power-down (standby) mode based on the bias level compensation signal.

10. The semiconductor integrated circuit device of claim 8, wherein the current leakage detector comprises a comparator configured to compare the internal voltage signal with the reference voltage signals to generate the current leakage state signal.

11. The semiconductor integrated circuit device of claim 8, wherein the leakage compensation pulse generator is configured to control the width of the clock pulse of the bias level compensation signal based on the current leakage state signal and configured to control the period of the clock pulse of the bias level compensation signal based on the temperature state signal to generate the bias level compensation signal.

12. The semiconductor integrated circuit device of claim 8, wherein the leakage compensation pulse generator comprises:

a clock pulse generator configured to receive the plurality of leakage current state signal and control the width of the clock pulse signal to output the clock pulse signal;

a counter receiving the clock pulse signal and dividing the clock pulse signal to generate clock pulse signals with different periods; and a clock pulse selector configured to receive the clock pulse signals, generate a plurality of clock signals based on the temperature state signal and the clock pulse signals, and output any one of the clock signals as the bias level compensation signal.

13. The semiconductor integrated circuit device of claim 12, wherein the clock pulse selector comprises:

a plurality of logic gates configured to receive the clock pulse signals with the different periods to generate the clock signals with different periods; and a multiplexer configured to select any one of the clock signals based on the temperature state signal and output the selected clock signal as the bias level compensation signal.

14. The semiconductor integrated circuit device of claim 12, wherein the counter comprises a plurality of counters configured to receive and divide the clock pulse signals to generate the clock pulse signals with the different periods.

15. The semiconductor integrated circuit device of claim 12, wherein the clock pulse selector is configured to select the clock pulse signals with the different periods, select any one of the clock signals based on the temperature state signal, and output the selected clock signal as the bias level compensation signal.

16. A method of compensating for current leakage in a semiconductor integrated circuit device, the method comprising:

comparing an internal voltage signal with a reference voltage signals to generate a current leakage state signal;

controlling a width and a period of a clock pulse of a bias level compensation signal based on the current leakage state signal and a temperature state signal; and generating an internal voltage based on the bias level compensation signal.

17. The method of claim 16, wherein generating the current leakage state signal comprises:

comparing the reference voltage signal with the internal voltage signal; and enabling the current leakage state signal when the internal voltage signal is lower than the reference voltage signal.

18. The method of claim 16, wherein controlling the clock pulse of the bias level compensation signal comprises:

controlling the width of the clock pulse of the bias level compensation signal based on the current leakage state signal; and controlling the period of the clock pulse of the bias level compensation signal based on the temperature state signal.

19. The method of claim 16, wherein generating the internal voltage signal based on the bias level compensation signal comprises periodically generating the internal voltage signal in a power-down (standby) mode in which current leakage is compensated for based on a complementary signal of a power-down signal or the bias level compensation signal and periodically generating the internal voltage signal at a constant level in an active mode based on the bias level compensation signal.

20. A semiconductor integrated circuit device comprising:

a current leakage detector configured to compare an internal voltage signal with a plurality of reference voltage signals with different levels to generate a plurality of leakage current state signals;

a leakage compensation pulse generator configured to generate a bias level compensation signal based on the plurality of leakage current state signals and a temperature state signal; and a leakage compensation voltage generator configured to generate the internal voltage signal in a power-down (standby) mode based on the bias level compensation signal.

* * * * *